United States Patent [19]

Suzuki

[11] Patent Number: 5,327,253
[45] Date of Patent: Jul. 5, 1994

[54] FACSIMILE TRANSMISSION METHOD

[75] Inventor: Yuji Suzuki, Nagaokakyo, Japan

[73] Assignee: Murata Kikai Kabushiki Kaisha, Kyoto, Japan

[21] Appl. No.: 808,373

[22] Filed: Dec. 16, 1991

[30] Foreign Application Priority Data

Dec. 17, 1990 [JP] Japan ................................ 2-411128

[51] Int. Cl.⁵ ............................................... H04N 1/41
[52] U.S. Cl. .................................... 358/426; 358/427
[58] Field of Search ................ 358/426, 261.1, 261.2, 358/261.3, 427, 262.1, 428, 429, 431, 432, 433; 382/56; 341/51, 65, 67; H04N 1/41

[56] References Cited

U.S. PATENT DOCUMENTS 4,800,441 1/1989 Sato ...................................... 358/426

*Primary Examiner*—Mark R. Powell
*Assistant Examiner*—Jerome Grant, II
*Attorney, Agent, or Firm*—Spensley Horn Jubas & Lubitz

[57] ABSTRACT

A page of MMR coded picture data may be transmitted with MMR coded journal data added to the page at the time of transmission. The first line of journal data may be transmitted after it is MMR coded using a total white line as a virtual line. Thereafter, the data of all lines of journal data may MR coded using a preceding line as a reference line and transmitted. A line which may be the same as the virtual line may then be MR coded and transmitted. The MMR coded picture data may then be transmitted line by line directly from a memory. Accordingly, all of the data may be decoded as MR code at the receiving side.

4 Claims, 2 Drawing Sheets

FACSIMILE TRANSMISSION METHOD

BACKGROUND OF THE INVENTION

1. Field of the Invention

The present invention relates to a facsimile transmission method utilizing the MMR coding system.

2. Description of Prior Art

In the facsimile, many systems have been proposed for coding image information to be transmitted. The systems are the MH coding system, the MR coding system and the MMR coding system which are now widely employed. These systems are outlined hereunder.

MH Coding System

The MR coding system utilizes the correlation of adjacent picture elements in the main scanning direction (lateral direction). One run-length (indicating the length of black or white continued in the single line with an integer) is indicated by one or two MH codes. A code indicating the end of line (EOL) is given next to the code indicating the last run-length of the one line.

MR Coding System

The MR coding system utilizes the correlation of picture elements not only in the main scanning direction, but also in the subscanning direction (vertical direction). The coding is executed with the data of a changing point through a comparison between the run-length of the one preceding line and the run-length of the coding line. However, the leading line of the leading page and a line of every constant lines (for instance, normal mode is defined in every two lines, fine mode in every four lines and super fine level in every eight lines) are coded by the MH coding system. A code indicating the end of line (EOL) is given next to the code indicating the last run-length of the line.

MMR Coding System

The MMR coding system codes the first line on a page to the last line with the MR coding system. However, in the case of coding the leading line of a page, a virtual line of total white is used as the reference line for comparing the changing points. Therefore, in the case of decoding the first line of a page, decoding is executed in the receiving side under the supposition that a total white line exists before the first line.

Among these coding systems, the MMR coding system is now widely used because of its advantages that coding efficiency is high, redundancy is low and high speed transmission and reception are possible.

Meanwhile, so-called memory transmission such as broadcasting transmission, delayed transmission, relayed transmission and random access request transmission, in which picture data is stored once in a the memory and for transmission is read for transmission from the memory at the time of transmission, is now used. In the case of memory transmission, the MMR coding system, which uses a relatively small amount of memory, is suitable.

At the time of memory transmission, direct memory transmission, in which the picture data stored in the memory is read from the memory and transmitted, may be used. Of course, the picture data to be stored in the memory is capable of taking the data format of bit data read in direct or run-length data converted from such bit data, but it is a very effective method to store the picture data in a data format that enables direct memory transmission, especially when considering memory capacity and the necessity of coding at the time of transmission.

During transmission of picture data, journal data such as the name of transmitting side, transmission time, page number, etc. are added to the picture data.

Even in the case of memory transmission, the journal data is added. However, in the MMR coding system, the direct memory transmission is disabled when the journal data is added.

The reason will then be explained hereunder. When the picture data coded by the MMR coding system and stored in the memory is transmitted following the journal data coded also by the MMR coding system, the first line of picture data is decoded using the last line of journal data as the reference line. Therefore, decoding is not carried out normally in the receiving side.

For normal decoding, a gap between the journal data and picture data must be discriminated in the receiving side, but that is impossible. It is possible to send a particular code indicating the gap. This solution is unsatisfactory because specially designed facsimile apparatus which can discriminate such code are required.

FIG. 4 is a diagram for explaining the flow of data when journal data is added to picture data stored in the memory in the transmission method using the MMR coding system. The journal data is converted to a bit pattern and is then coded to RL (run-length) code. The picture data stored in memory stored as MMR code read and decoded as the RL code for the matching with the journal data. Here, the picture data is added after the journal data to form a single page of data and is then transmitted after coding to the MMR code. Therefore, the picture data stored in the memory must be converted twice, namely once converted to the RL code and then converted to the MMR code. As a result, the advantage of high speed processing using the MMR code cannot be utilized.

In the cases where the journal data is added after the picture data or the other picture data is coupled with the one picture data and these data are transmitted as the single page of picture data, the data of MMR code is also converted twice, namely to be coupled after it is once converted to the RL code and is then converted to the MMR code.

SUMMARY OF THE INVENTION

The present invention has been proposed to solve the problems explained above and it is therefore an object of the present invention to provide a simplified facsimile transmission method in which a plurality of data including the MMR code is added together to form a single page of data.

In accordance with a preferred embodiment of the present invention, a facsimile transmission method for transmitting a plurality of picture data, including picture data coded by the MMR coding system, as a single page may include adding data which is the same as that of a virtual line after the last line of the preceding picture data.

FIG. 3 is a diagram for explaining operation of a facsimile transmitting method in accordance with the preferred embodiment of the present invention. Coupling of picture data after the journal data will be explained. In this figure, J1, J2, J3, ..., JM denote lines of journal data, while P1, P2, P3, ..., PN denote lines of picture data. The first line J1 of journal data is coded by the MR code using a total white line S0 as the reference line. S0 is the virtual line and this line is considered to be preceded during the coding of the first line J1. This virtual reference line is called a "virtual line". The second line J2 is coded to the MR code using the first line J1 as the reference line. In the same manner, the J3, . . ., JM lines are also coded respectively to the MR code using the one preceding line as the reference line. In accordance with the preferred embodiment, a total white line R0 of the same data as the reference line is added next to the last line JM of the journal data. Line R0 is coded to the MR code using the one preceding line JM as the reference line. The lines of J1 to R0 where R0 is added is the journal data A.

The first line P1 of the picture data is coded, like the journal data, to the MR code using the virtual line as the reference line. In the same manner, the P2, . . ., PN lines are also coded to the MR code and the P1 to PN lines are picture data B.

Transmission of data by adding the journal data before picture data can be realized only by continuously transmitting the journal data A and picture data B.

In the case of decoding at the receiving side, the first line J1 is decoded under the supposition that the virtual line is preceded as the reference line. In the same manner, decoding is carried out using the line one preceding the decoding of J2, . . ., JM, R0 as the reference line. Since the first line P1 of picture data is decoded using the preceding R0 as the reference line, normal decoding can be realized. P2, P3, . . ., PN are decoded using the one preceding line as the reference line.

When the journal data is added after the picture data, it is enough that R0 is added after the last line of the picture data.

As explained above, in case a plurality of data are coupled, normal decoding can be realized at the receiving side only by continuation of data coded by the MMR coding through the process that the line same as the virtual line is added after coding by the MR coding system after the last line of the preceding picture data.

Accordingly, the picture data stored in the memory as the MMR code can be transmitted as is, thus realizing the benefits of direct memory transmission.

DETAILED DESCRIPTION OF THE INVENTION

Figure 2:
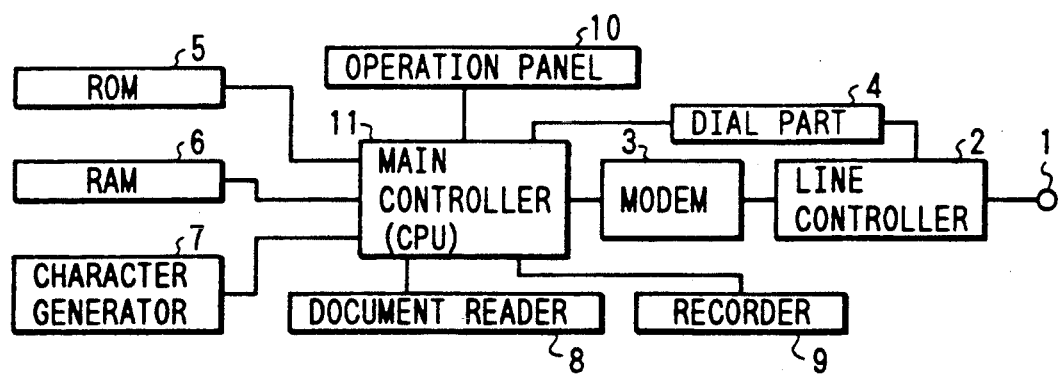
FIG. 2 is a schematic diagram indicating a composition of a facsimile apparatus to be used in the embodiment of FIG. 1.

FIG. 2 is a schematic diagram indicating the composition of a facsimile apparatus which may be used in conjunction with the present invention. In this figure, reference numeral 1 denotes a line; 2, a line controller; 3, a modem; 4, a dial part; 5, ROM for storing program and fixed information; 6, RAM; 7, a character generator; 8, a document reader; 9, a recorder; 10, an operation panel; 11, a main controller (CPU) for controlling entire part of apparatus.

The data received from the line 1 and picture data read by the document reader 8 can be stored in the RAM 6. Data format of data to be stored in the RAM 6 may be set adequately but the picture data read by the document reader 8 is coded to the MMR code and is then stored in the RAM 6 in the case of direct memory transmission. The dial part 4 transmits the dial signal and connects it to the line with the line controller 2.

The journal data generated by the main controller 11 is converted to picture data by the character generator 7 and is then stored in the RAM 6. In this case, data is stored in the RAM 6 as the RL code.

Figure 1:
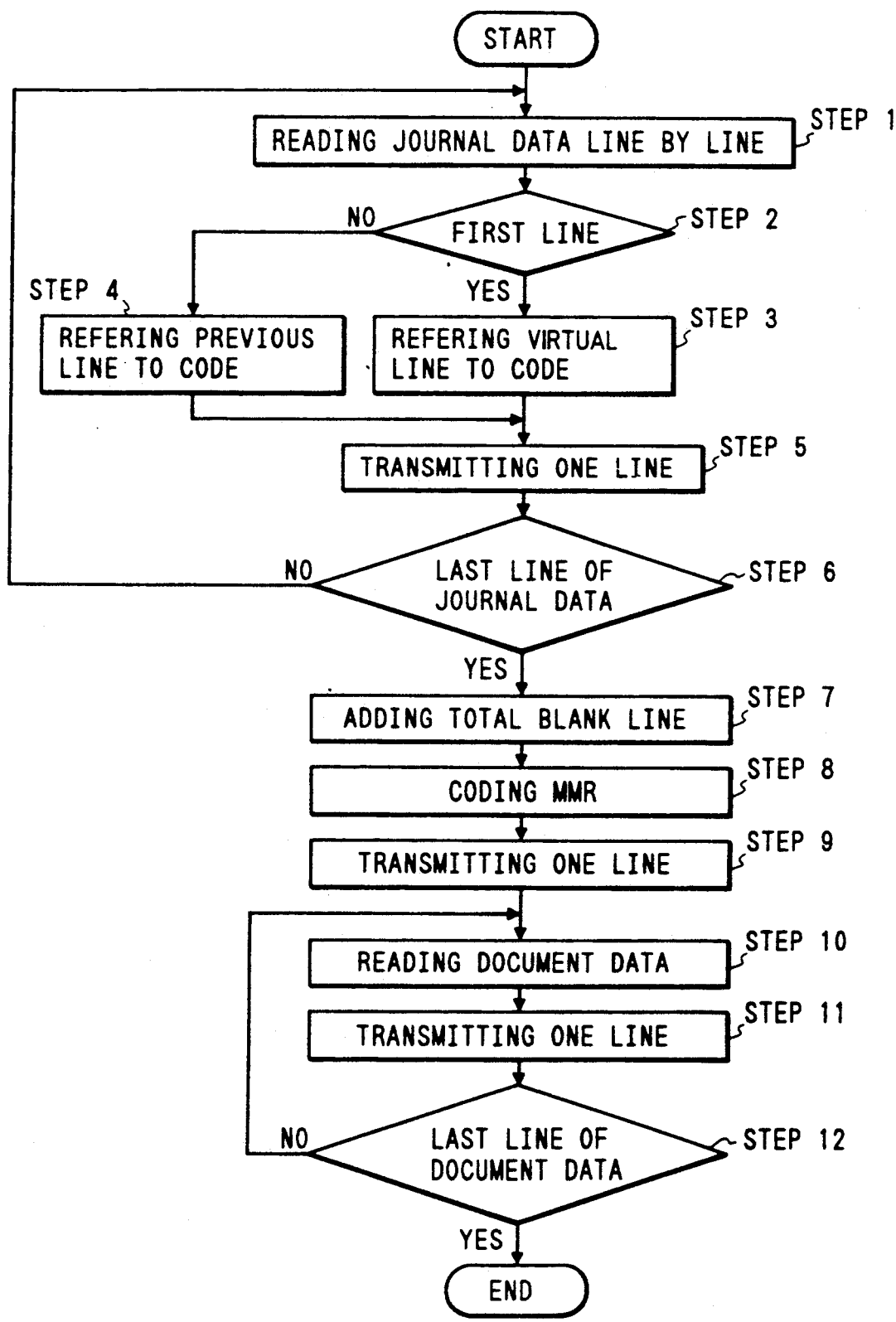
FIG. 1 is a flowchart of a preferred embodiment of a facsimile transmission method in accordance with the present invention.

FIG. 1 is a flowchart for explaining a preferred embodiment of a facsimile transmission method in accordance with the present invention. In this embodiment, it is assumed that the journal data is added before document data.

Figure 3:
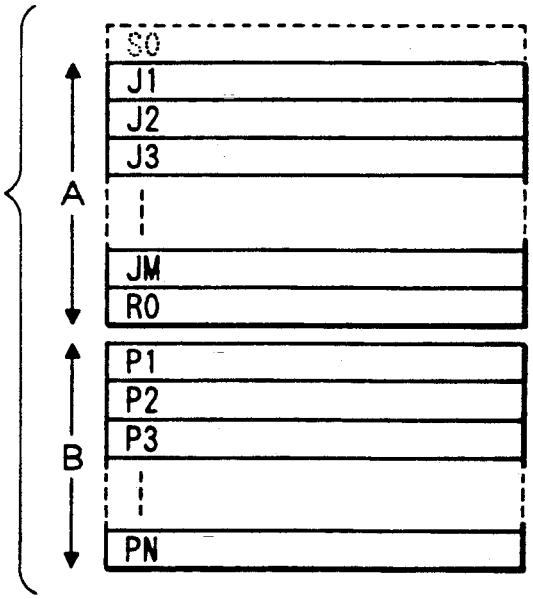
FIG. 3 is a diagram for explaining operations of the present invention.
Figure 4:
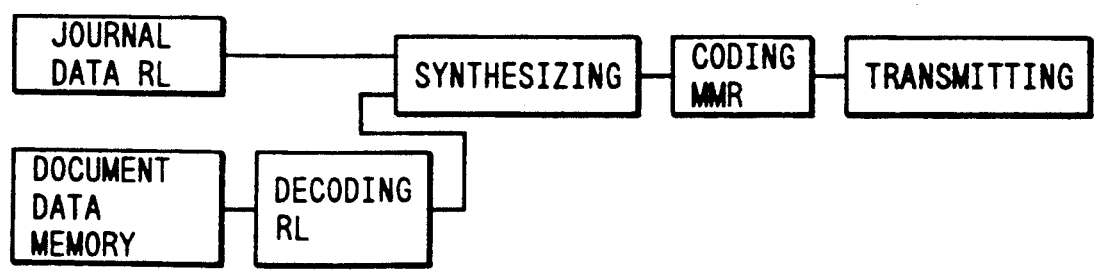
FIG. 4 is a diagram for explaining the transmitting method by the conventional MMR coding system.

When the memory transmission button at the operation panel is depressed or when a set transmission dial time comes, the processing flow starts. In step 1, the generated journal data is read line by line. In step 2, the first line is read from RAM 6. In step 3, the virtual line is coded to the MR code as reference line. In the step 5, transmission of the first line is executed. Thereafter, step 6 is looped to step 1. Here, the second line is read. Operation then skips to step 4 from step 2. The data is coded to the MR code using the first line as the reference line. In step 5, the second line is transmitted and step 6 is looped to the step 1. With repetition of the loop of step 1 to step 2, step 4, step 5 and step 6, the last line of journal data is transmitted. Here, operation skips to step 7 from the loop. In step 7, the total white line which is same as the virtual line is added. It is then coded, in step 8, to the MR code using the last line of journal data as the reference line. In step 9, this data is transmitted. Here, transmission of journal data, namely transmission of the part A of FIG. 3 is completed and the document data (part B of FIG. 3) stored in the RAM is transmitted following the journal data. In step 10, one line of the document data coded to the MMR code is read from the RAM and it is then transmitted in step 11. Step 12 is looped to step 10. With repetition of this process up to the last line data is transmitted in direct line by line from the RAM. When the last line is transmitted, operation flow is completed.

As explained above, the journal data and document data can be transmitted by the MMR coding system. Thus, high speed direct memory transmission can be realized.

In accordance with the embodiment described above, the journal data is stored as the RL data in the RAM, it is then transmitted while it is coded to the MMR code and it is coupled with the document data after the line data same as the virtual line is added. But, when the line data same as virtual line is added after the journal data and it is coded to the MMR code and it is then stored in the RAM, the document data can be transmitted by the MMR coding system after addition of the journal data only by continuously reading both.

Moreover, a single page of data may be transmitted by coupling the journal data and document data in the manner explained above. The present invention, however, is not restricted thereto and may also be applied to every data which allows transmission of a plurality of data coded by the MMR code as single page.

As is obvious from above explanation, according to the present invention, the data of MMR coding system can be transmitted without any code conversion at the time of transmission. Therefore, the facsimile transmission method, which ensures direct memory transmission and high speed processing of MMR code, can be realized.

What is claimed is:

1. A method of transmitting image data comprising the steps of:

transmitting journal data, the journal data including a last line of journal data;

inserting an MR coded white line after the last line of journal data; and transmitting picture data after the MR coded white line, the picture data including a first line of picture data, the MR coded white line being a reference line for the first line of picture data;

wherein the journal data, the MR coded white line and at least a portion of the picture data define a single page of image data.

2. The method of claim 1, wherein the step of transmitting journal data comprises:

transmitting a first line of MMR coded journal data using a white line as a virtual line; and transmitting a second line of MMR coded journal data using the first line of MMR coded journal data as a reference line.

3. The method of claim 2, wherein the step of inserting an MR coded white line comprises:

inserting an MR coded white line which is substantially similar to the virtual line using the last line of journal data as a reference line.

4. The method of claim 3, wherein the step of transmitting picture data comprises:

reading a first line of MMR coded picture data from a memory; and transmitting the first line of MMR coded picture data prior to reading a second line of MMR coded picture data from the memory.

* * * * *